United States Patent [19]

Gosselin

[11] 4,089,430
[45] May 16, 1978

[54] FARM IMPLEMENT TRAILER

[76] Inventor: Andrew F. Gosselin, R.R. 1, Bogue, Hill City, Kans. 67625

[21] Appl. No.: 801,167

[22] Filed: May 27, 1977

[51] Int. Cl.² ............................................. B60P 3/40
[52] U.S. Cl. ................................ 214/86 A; 172/240; 214/394; 280/402; 280/414.5
[58] Field of Search ............. 214/392, 394, 396, 86 A; 280/476 R, 476 A, 402, 414 B, 414.5; 254/139.1; 172/240, 243, 244, 246, 247, 317, 318, 319, 320

[56] References Cited

U.S. PATENT DOCUMENTS

| | | | |
|---|---|---|---|
| 2,533,999 | 12/1950 | Colley | 214/394 X |
| 2,657,938 | 11/1953 | Browne et al. | 214/394 X |
| 2,696,772 | 12/1954 | Underdown | 172/240 X |

Primary Examiner—Albert J. Makay
Attorney, Agent, or Firm—Edwin H. Crabtree; John H. Widdowson

[57] ABSTRACT

A farm implement trailer for towing a farm implement laterally on a highway, dirt road, or the like. The trailer straddling the back of the farm implement and raising the back of the implement above the ground surface. The trailer co-acting with caster wheels mounted on the front of the farm implement thereby allowing the farm implement to be towed on the trailer laterally.

9 Claims, 6 Drawing Figures

U.S.Patent May 16, 1978 Sheet 2 of 2 4,089,430
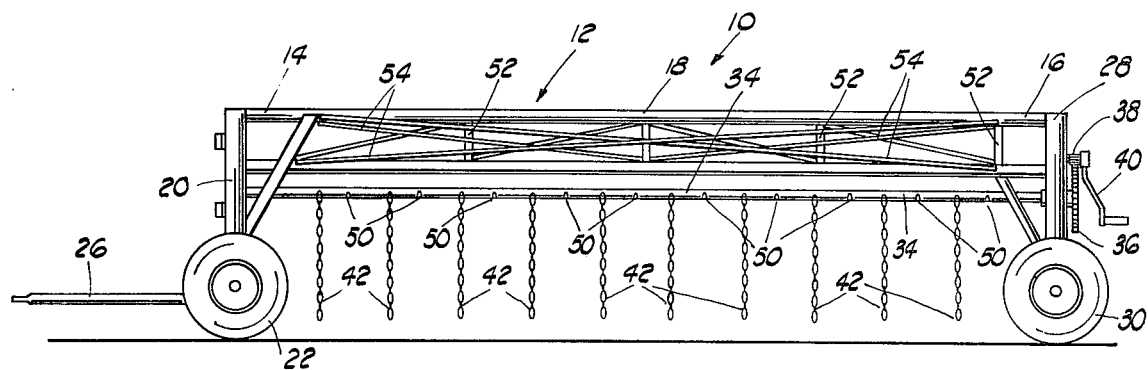
FIG. 2
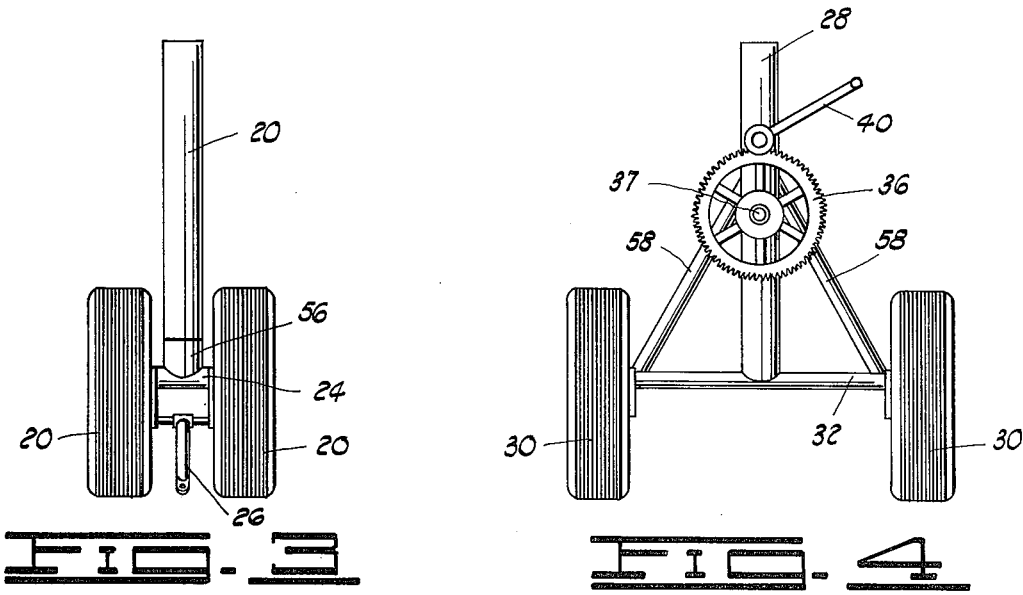
FIG. 3
FIG. 4
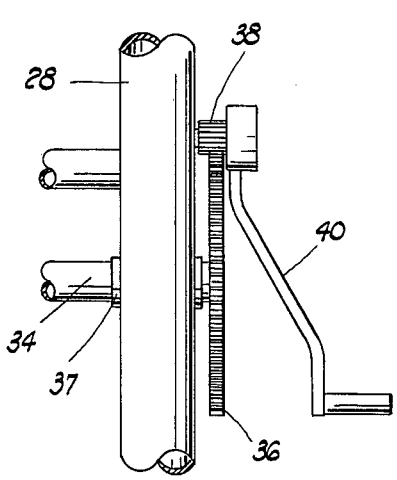
FIG. 5
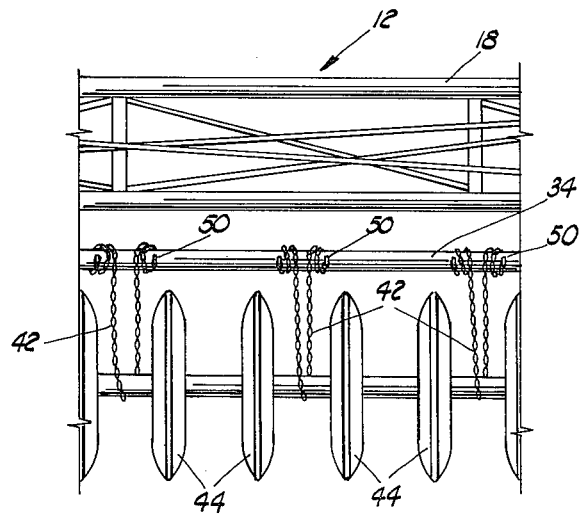
FIG. 6

4,089,430

FARM IMPLEMENT TRAILER

BACKGROUND OF THE INVENTION

This invention relates generally to trailers and more particularly, but not by way of limitation, to a farm implement trailer for towing the farm implement laterally on a highway, dirt road, or the like.

Heretofore, farm implements and in particular a hoe drill has been difficult to transport on a highway because the width of the drill exceeds the width allowed by highway law. Because it is very difficult to dismantel the implement, the law is often broken and the hoe drill is transported on the highway or on farm roads which are normally more narrow than the highway. This poses great danger of an accident to the person transporting the hoe drill or people traveling on the highway or farm road.

Also because of the width of the hoe drill, it is often difficult to negotiate the drill on narrow dirt roads and therefore the transporting of the hoe drill from one location to another takes considerable time.

There are various prior art wheeled trailer frames for mounting on tractor drawn farm implements. Also, there are trailers for attaching to hoe drills, grain drills, disc harlows and cultivators having different types of wheeled structure for raising the farm implement above the ground so that the implement may be transported. None of the prior art farm implement trailers disclose the novel structure of the subject invention as described herein.

SUMMARY OF THE INVENTION

The subject invention provides a trailer for transporting a farm implement laterally on a highway thereby eliminating the danger of exceeding the overall width requirement of a vehicle on a highway. Also, the trailer provides means for quickly transporting the farm implement from one location to another.

The trailer straddles the back of a farm implement such as a hoe drill and lifts the back of the drill above the ground surface so that the wheels of the trailer co-act with the caster wheels of the drill in transporting the farm implement laterally.

The invention is rugged in construction, simple in design and can be quickly attached to the farm implement for transporting the implement. The tractor is quickly removed from the implement so that the implement can be put back into farm service.

The farm implement trailer includes an elongated straddle frame disposed parallel to the length of the farm implement and straddling the back of the farm implement. A pair of pivotally mounted front wheels are attached to the front of the frame. A pair of rear wheels are attached to the rear of the frame. An elongated lift bar is mounted at both ends to the frame and parallel thereto. The lift bar includes a plurality of chains which are suspended therefrom. The chains are used for wrapping around the back of the farm implement and securing the implement to the lift bar. The lift bar is rotated on the frame thereby rotating the chains around the lift bar and raising the back of the farm implement above the ground surface. One end of a tow bar is attached to the front of the frame. The other end of the tow bar is attached to a pulling vehicle for transporting the farm implement on the farm implement trailer.

The advantages and objects of the invention will become evident from the following detailed description when read in conjunction with the accompanying drawings which illustrate the preferred embodiments of the invention.

BRIEF DESCRIPTION OF THE DRAWINGS

FIG. 2 is a side view of the trailer.

FIG. 3 is a front view of the front wheels of the trailer.

FIG. 4 is a rear view of the rear wheels of the trailer.

FIG. 5 is an enlarged view of a handle, pinion gear, and gear wheel used for raising and lowering a lift bar on the trailer.

FIG. 6 is a sectional view of the lift bar with chains wrapped around press wheels mounted on the back of the hoe drill.

DETAILED DESCRIPTION OF THE DRAWINGS

Figure 1:
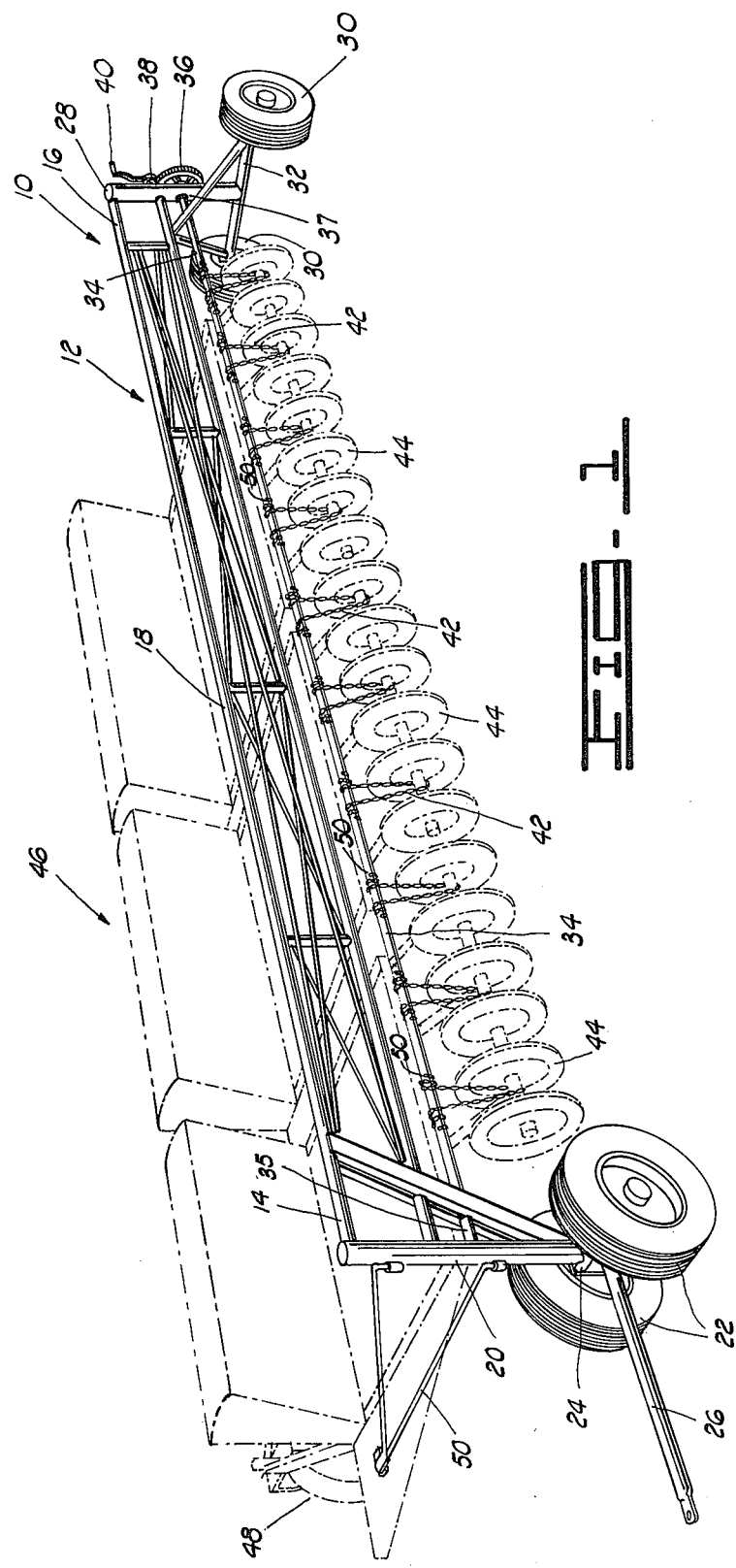
FIG. 1 is a perspective view of the farm implement trailer attached to the back of a hoe drill for transporting the farm implement laterally.

In FIG. 1, the farm implement trailer is designated by general reference numeral 10. The trailer 10 includes an elongated straddle frame 12. The frame 12 includes a front end portion 14, a rear end portion 16 and a center portion 18. A vertical front post is attached to the front end portion 14 of the frame 12. A pair of front wheels 22 are mounted on an axle 24. The axle 24 is pivotally attached to the bottom of the vertical post 20. Extending outwardly from the axle 24 and attached thereto is a tow bar 26 which is used for pulling the trailer 10.

A vertical rear post 28 is attached to the rear end portion 16 of the frame 12. A pair of rear wheels 30 are mounted on an axle 32. The axle 32 is attached to the bottom of the rear post 28 and is perpendicular to the elongated frame 12.

An elongated lift bar 34 is mounted parallel to the frame 12 with one end 35 rotatably attached to the vertical front post of the frame 12. An other end 37 is rotatably mounted on the rear post 28. The end 37 of the lift bar 34 is attached to a gear wheel 36. A pinion gear 38 is rotatably mounted on the rear post 28 and meshes with the gear wheel 36. A handle 40 is attached to the pinion gear 38 and provides means for rotating the gears 36 and 38 and the lift bar 34.

Suspended from the lift bar 34 are a plurality of chains 42. One end of the chains 42 is attached to the lift bar 34. The other end of the chains 42 is wrapped around the axle of press wheels 44. The press wheels 44 form a portion of the back of a hoe drill 46. The front of the drill 46 includes a plurality of castered wheels 48. The caster wheels 48, while only one is shown in FIG. 1, are used for steering the drill 46 as it is pulled by a tractor in the field. It should be noted that while a hoe drill 46 is shown having caster wheels 48, any type of farm implement having caster wheels may be used by the trailer 10 in moving the farm implement laterally rather than lengthwise on a highway or road.

The trailer 10 further includes a swing brace 50 pivotally attached at one end to the front post 20. The other end of the brace 50 is secured to the side of the hoe drill 46. The swing brace 50 helps stabilize the hoe drill 46 on the trailer 10 when it is being transported laterally.

The axle 32 of the rear wheels 30 has a greater width than the axle 24 of the front wheels 22. The rear axle 32 and the wheels 30 provide a wider wheel base for greater control in transporting the drill 46. The front wheels 22 and axle 24 are pivotally attached to the front post 20 and provide means for steering the trailer 10 and the attached drill 46.

In operation, when it is desired to transport the drill 46 from one location to another, the trailer 10 is wheeled into a position at the rear of the drill 46. By pivoting the front wheels 22, the center portion 18 of the frame 12 is positioned over the back of the drill 46 and straddling the press wheels 44. In this position, the press wheels 44 are resting on top of the ground surface. The elongated lift bar 34 is rotated using handle 40. The chains 42 are lowered their entire length so that one end of the chains 42 can be wrapped around the axle of the press wheels 44. The end of the chains 42 is then releasably attached to hooks 50 which are mounted on the lift bar 34 along its length. When the chains 42 have been wrapped around the axle of the press wheels 44 and attached to the hooks 50 on the lift bar 34, the lift bar 34 is again rotated by turning the handle 40 thereby wrapping the chains 42 around the lift bar 34. As the chains 42 are wrapped around the lift bar 34, the press wheels 44 are raised upwardly above the ground surface. When sufficient clearance is provided between the bottom of the press wheels 44 and the ground surface, the handle 40 is locked in position on the rear post 28 thereby holding the lift bar 34 in position. The swing brace 50 is attached to the side of the hoe drill 46. The trailer 10 is now ready to transport the drill 46 laterally. The two bar 26 is releasably attached to a towing vehicle. As the trailer 10 is moved forward, the caster wheels 48 of the drill 46 pivot until they are parallel with the front wheels 22 and rear wheels 30 of the trailer. The wheels of the trailer 10 now co-acting with the caster wheels 48, allow the drill 46 to be moved endwise or laterally.

When the drill 46 has been relocated, swing brace 50 is disengaged from the drill 46 and the lift bar 34 is rotated by the handle 40 lowering the chains 42 on the lift bar 34 which in turn lowers the press wheels 44 to the ground surface. When the press wheels 44 are resting on top of the ground surface, the chains 44 are removed at one end from the hooks 50 on the lift bar 34 and the chains 42 are unwrapped from the axle of the press wheels 44. The swing brace 50 is detached from the side of the hoe drill 46 and the drill 46 is pulled away from under the trailer 10. The trailer 10 is stored until it is again required for transporting the drill 46 or a similar farm implement.

In FIG. 2, a side view of the trailer 10 is shown. In this view the overall length of the frame 12 can be seen including vertical bracing 52 and angular bracing 54 for strengthening the structure of the center portion 18 of the frame 12. Also seen in this view is the plurality of chains 42 suspended downwardly from the elongated lift bar 34 with the hooks 50 attached to the lift bar 34 and adjacent each of the chains 42 for receiving the end of the chains 42 when it is wrapped around the back of the farm vehicle.

In FIG. 3, a front view of the front wheels 22 and axle 24 is illustrated. The front axle includes a vertical sleeve 56 extending upwardly from the axle 24 and pivotally mounted inside the bottom of the front post 20. Also seen in this view is the tow bar 26 extending outwardly toward the reader.

In FIG. 4, a rear view of the rear wheels 30 and rear axle 32 is illustrated. Attached to the rear axle 32 is bracing 58 for providing stability of the axle 32 on the rear post 28. Also seen in this view is the end portion 37 of the lift bar 34 attached to the gear wheel 36.

In FIG. 5, a side view of the gear wheel 36 is shown meshing with the pinion gear 38. The pinion gear 38 is rotatably attached at one end to the rear post 28 with the other end attached to the handle 40. By turning the handle 40, the pinion gear 38 rotates the gear wheel 36. The gear wheel 36 rotates the lift bar 34.

In FIG. 6, a partial enlarged side view of the center portion 18 of the frame 12 and lift bar 34 is illustrated. In this view, the chains 42 can be seen wrapped around the axle of the press wheels 44 with the end of the chains 42 releasably attached to the hook 50 on the lift bar 34. The press wheels 44 are shown in a raised position above the ground surface.

Changes may be made in the construction and arrangement of the parts or elements of the embodiments as disclosed herein without departing from the spirit or scope of the invention as defined in the following claims.

I claim:

1. A farm implement trailer for towing a farm implement on a highway transverse to its normal operating mode, the front of the farm implement having castered wheels, the trailer comprising:
   a wheel mounted elongated straddle frame having a front end portion, a rear end portion and a center portion, said frame disposed parallel to the length of the farm implement and straddling the back of the farm implement;
   an elongated lift bar, one end of said bar rotatably attached to the front end portion of said frame, the other end of said lift bar rotatably attached to the rear end portion of said frame;
   means for rotating said lift bar mounted on said frame; and
   attachment means suspended from said lift bar for securing the back of the farm implement to said lift bar;
   the trailer wheels and the farm implement wheels forming a vehicle for highway travel.

2. The trailer as described in claim 1, further including a tow bar attached to the front end portion of said frame, said tow bar releasably engaging a pulling vehicle for transporting the farm implement on the farm implement trailer.

3. The trailer as described in claim 1, wherein said attachment means includes a plurality of chains attached to said lift bar and disposed along the length thereof and suspended therefrom, said chains used for wrapping around a portion of the back of the farm implement for securing the farm implement to said lift bar.

4. The trailer as described in claim 1, wherein said rotation means includes a gear wheel attached to the other end of said lift bar, a pinion gear rotatably attached to the rear portion of said frame and meshing with said gear wheel, and a handle attached to said pinion gear for rotating said gears and said lift bar.

5. The trailer as described in claim 1, wherein said wheel mounted frame includes a pair of front wheels mounted on an axle, the axle pivotally attached to the front end portion of said frame, and a pair of rear wheels mounted on an axle, the axle attached to the rear portion of said frame.

6. A farm implement trailer for towing a farm implement on a highway transverse to its normal operating mode, the front of the farm implement having castered wheels, the trailer comprising:

an elongated straddle frame having a front end portion, a rear end portion, and a center portion, said frame disposed parallel to the length of the farm implement and straddling the back of the farm implement;

a vertical front post attached to the front end portion of said frame;

a pair of front wheels mounted on an axle, the axle pivotally attached to the bottom of said front post;

a vertical rear post attached to the rear end portion of said frame;

a pair of rear wheels mounted on an axle, the axle attached to the bottom of said rear post and perpendicular to said frame;

an elongated lift bar parallel to said frame and rotatably attached at one end to the front end portion of said frame, the other end of said lift bar rotatably attached to said rear post;

a gear wheel attached to the other end of said lift bar;

a pinion gear rotatably attached to said rear post and meshing with said gear wheel;

a handle attached to said pinion gear for rotating said gears and said lift bar;

a plurality of chains attached to said lift bar and disposed along the length thereof and suspended therefrom, said chains used for wrapping around a portion of the back of the farm implement for securing the farm implement to said lift bar, said chains wrapped around said lift bar when said lift bar is rotated thereby lifting the back of the farm implement above the ground surface; and a tow bar attached to the axle of said front wheels, said tow bar releasably engaging a pulling vehicle for transporting the farm implement on the farm implement;

the trailer wheels and the farm implement wheels forming a vehicle for highway travel.

7. The trailer as described in claim 6, further including a swing brace pivotally mounted on said front post, the other end of said swing brace attached to the farm implement for stabilizing the trailer on the farm implement when the farm implement is towed.

8. The trailer as described in claim 6, wherein said lift bar is horizontally mounted and disposed below the center portion of said elongated frame.

9. The trailer as described in claim 6, wherein said chains having one end attached to said lift bar, the other end of said chains releasably engaging hooks mounted along the length of said lift bar.

* * * * *